United States Patent
Pecinovsky (10) Patent No.: US 9,562,191 B2
(45) Date of Patent: Feb. 7, 2017

(54) COMPOSITIONS AND METHODS FOR REMOVING IONS FROM LIQUID CRYSTAL MATERIALS

(71) Applicant: CITIZEN FINEDEVICE CO., LTD., Fujikawaguchiko-machi, Minamitsuru-gun, Yamanashi-ken (JP)

(72) Inventor: Cory S. Pecinovsky, Lafayette, CO (US)

(73) Assignee: CITIZEN FINEDEVICE CO., LTD. (JP)

( * ) Notice: Subject to any disclaimer, the term of this patent is extended or adjusted under 35 U.S.C. 154(b) by 0 days.

(21) Appl. No.: 14/676,298

(22) Filed: Apr. 1, 2015

(65) Prior Publication Data

US 2016/0289564 A1 Oct. 6, 2016

(51) Int. Cl.
| | | |
|---|---|---|
| *B01D 15/08* | (2006.01) | |
| *B01D 21/00* | (2006.01) | |
| *B01D 37/00* | (2006.01) | |
| *B01J 20/26* | (2006.01) | |
| *G01N 15/06* | (2006.01) | |
| *C09K 19/52* | (2006.01) | |
| *C09K 19/54* | (2006.01) | |
| *C09K 19/00* | (2006.01) | |

(52) U.S. Cl.
CPC .............. *C09K 19/542* (2013.01); *B01D 15/08* (2013.01); *B01D 21/00* (2013.01); *B01D 37/00* (2013.01); *B01J 20/26* (2013.01); *C09K 19/00* (2013.01); *C09K 19/52* (2013.01); *C09K 2019/523* (2013.01); *C09K 2019/525* (2013.01)

(58) Field of Classification Search
CPC ..... B01D 11/02; B01D 11/0288; B01D 15/08; B01D 15/10; B01D 15/12; B01D 21/00; B01D 21/26; B01D 21/262; B01D 37/00; C09K 19/00; C09K 19/52; C09K 19/54; C09K 19/542; C09K 19/38; C09K 19/3804; C09K 19/3809; C09K 2019/521; C09K 2019/523; C09K 2019/525; C09K 19/02; C09K 19/0225; C09K 19/0241; C09K 19/025; C09K 19/04; G01N 15/06; G01N 15/10; G01N 2015/0662; G01N 2015/0687; G01N 2015/1031; G01N 2223/602; G01N 2223/604; G01N 2223/611; G01N 2223/646; G01R 27/00; G01R 29/00; G01R 29/22; G01R 31/12; G01R 31/1227; G01R 31/1263; G01R 31/1281; B01J 20/22; B01J 20/26; B01J 20/265
USPC ....... 210/634, 638, 639, 656, 663, 669, 767, 210/787, 800, 806; 252/299.01, 299.4, 252/299.5, 299.6; 324/600, 727; 349/122, 349/123, 124, 127, 129, 130; 428/1.2, 428/402; 436/106, 111, 161, 177, 178; 528/288, 310, 315, 322, 502, 502 R, 528/502 A
See application file for complete search history.

(56) References Cited

U.S. PATENT DOCUMENTS 4,681,404 A * 7/1987 Okada .................. G09G 3/3629
345/97
5,540,857 A 7/1996 Hirai et al.
(Continued)

FOREIGN PATENT DOCUMENTS

JP 64-87685 3/1989

*Primary Examiner* — Joseph Drodge
(74) *Attorney, Agent, or Firm* — Elevated IP, LLC (57) ABSTRACT

Liquid crystal compositions comprising a crude liquid crystal sample containing ions and polyamide particles are disclosed. Upon separation of the polyamide particles from the crude liquid crystal sample, a purified liquid crystal sample is produced, which shows a 1-2× reduction in ion
(Continued)

concentration. Methods for carrying out purification processes are also disclosed.

21 Claims, 4 Drawing Sheets

(56) References Cited

U.S. PATENT DOCUMENTS

| | | | | |
|---|---|---|---|---|
| 6,056,892 | A * | 5/2000 | Yoshioka | C07C 67/56 210/663 |
| 2003/0229162 | A1* | 12/2003 | Matsuoka | C08K 5/103 524/81 |
| 2005/0016923 | A1* | 1/2005 | Marquez-Sanchez | B01J 20/103 210/644 |
| 2006/0105158 | A1* | 5/2006 | Fritz | B01D 53/02 428/317.9 |
| 2006/0163535 | A1* | 7/2006 | Izumi | C09K 19/02 252/299.7 |
| 2010/0060836 | A1* | 3/2010 | Kunimatsu | C08G 73/1078 349/123 |
| 2011/0237422 | A1* | 9/2011 | Incorvia | B01J 20/26 502/1 |
| 2012/0065327 | A1* | 3/2012 | Ogawa | C08G 69/26 524/606 |

* cited by examiner

COMPOSITIONS AND METHODS FOR REMOVING IONS FROM LIQUID CRYSTAL MATERIALS

CROSS-REFERENCE TO RELATED APPLICATIONS

None.

STATEMENT REGARDING FEDERALLY SPONSORED RESEARCH OR DEVELOPMENT

None.

BACKGROUND

When an electric field is applied to a liquid crystal display system, migration of ions occurs within the liquid crystal layer. Those ions will migrate so as to counteract the electric field, with cations moving towards the negatively charged plate and anions moving towards the positively charged plate, resulting in a net reduction of the electric field. Since the optical response of the liquid crystal is determined by the strength of the applied electric field, this results in sub-optimal liquid crystal behavior. Although it is sometimes possible to counteract the electric field reduction by applying additional voltage, this approach is undesirable both because it requires additional power and because side-effects such as chemical breakdown or defect formation could result. Thus, ionic conductivity is one of the most important metrics of liquid crystal materials for use in display applications, and great efforts are made when manufacturing liquid crystals to produce high purity materials.

In order to produce high purity liquid crystal materials ionic impurities must be removed. Various methods for removing ionic impurities have been disclosed. For example, Unexamined Japanese Patent Publication No. 64-87685 discloses a process for removing impurities using an adsorbent material such as silica gel, alumina, styrene-divinylbenzene porous polymer beads and on exchange resins. However, adsorption onto these materials is so strong that both ionic impurities and polar groups, chiral agents and the like are adsorbed. U.S. Pat. No. 5,540,857 allegedly overcomes these issues by using custom synthesized porous particles of imido group-containing compounds to purify liquid crystals. However, the custom synthesized compounds of the '857 patent are not readily available or affordable materials.

SUMMARY

Disclosed herein are a process for producing purified liquid crystals, a liquid crystal composition, a liquid crystal cell and a liquid crystal display device using the purified liquid crystals.

In an aspect, a composition comprises a crude liquid crystal (LC) sample containing ions and polyamide (PA) particles having an average particle size between 0.1 μm and 1000 μm, wherein each nitrogen within the polyamide is bound to at least one hydrogen. Further, in an embodiment, the polyamide does not comprise bridging pairs of carbonyl groups.

In an embodiment, the polyamide has the formula (FX1):

(FX1)

where $R_1$ is selected from the group consisting of a chemical bond, a $C_{1-10}$ aliphatic group, an aromatic group with one or more rings and an —$R_2CONHR_3$— group, where $R_2$ and $R_3$ are each independently selected from a $C_{1-10}$ aliphatic group and an aromatic group with one or more rings; and where n is an integer greater than or equal to 10. In an embodiment, $R_1$ is a chemical bond, a $C_{1-20}$ aliphatic group, a $C_{1-18}$ aliphatic group, a $C_{1-15}$ aliphatic group, a $C_{1-12}$ aliphatic group, a $C_{1-10}$ aliphatic group, or a $C_{1-6}$ aliphatic group. In an embodiment, the aromatic group is a substituted or unsubstituted phenyl, pyridyl, napthyl or benzyl group. In an embodiment, n is an integer greater than or equal to 10, greater than or equal to 25, greater than or equal to 50, greater than or equal to 100, or greater than or equal to 500.

In an embodiment, the polyamide has the formula (FX2):

(FX2)

where $R_2$ and $R_3$ are each independently selected from a $C_{1-10}$ aliphatic group and an aromatic group with one or more rings; and where n is an integer greater than or equal to 10. In an embodiment, $R_1$ is a chemical bond, a $C_{1-20}$ aliphatic group, a $C_{1-18}$ aliphatic group, a $C_{1-15}$ aliphatic group, a $C_{1-12}$ aliphatic group, a aliphatic group, or a $C_{1-6}$ aliphatic group. In an embodiment, the aromatic group is a substituted or unsubstituted phenyl, pyridyl, napthyl or benzyl group. In an embodiment, n is an integer greater than or equal to 10, greater than or equal to 25, greater than or equal to 50, greater than or equal to 100, or greater than or equal to 500.

The polyamide generally has a density selected from a range of 1.01 g/mL to 1.3 g/mL, or 1.1 g/mL to 1.2 g/mL, or 1.12 g/mL to 1.2 g/mL, or 1.14 g/mL to 1.17 g/mL. In some embodiments, the polyamide is selected from the group consisting of nylons and aramids. For example, the polyamide may be selected from the group consisting of nylon-6, nylon-6,6, nylon-6,9, nylon-6,10, nylon-6,12, nylon-11, nylon-12 and nylon-4,6. In other embodiments, the polyamide may be selected from the group consisting of poly-paraphenylene terephthalamide and poly-metaphenylene isophthalamide.

Typically, the polyamide is present at a concentration of 1 wt. % to 50 wt. %, or 1 wt. % to 45 wt. %, or 1 wt. % to 40 wt. %, or 1 wt. % to 30 wt. %, or 1 wt. % to 20 wt. %, or 1 wt. % to 10 wt. % based on the weight of the crude liquid crystal sample.

Upon separation of the polyamide particles from the crude liquid crystal sample a purified liquid crystal sample comprising fewer ions than the crude liquid crystal sample is produced. In an embodiment, the polyamide particles selectively adsorb the ions of the crude liquid crystal sample relative to the nonpolar molecules in that sample, and do not substantially adsorb polar molecules within the crude liquid crystal sample. The purified liquid crystal sample may, for example, provide a resistivity at least one-half order of magnitude greater than a resistivity of the crude liquid crystal sample, or at least one order of magnitude greater than a resistivity of the crude liquid crystal sample.

In some embodiments, the crude liquid crystal sample is neat. In other embodiments, the crude liquid crystal sample is combined with a solvent. For example, the solvent may be selected from the group consisting of toluene, hexanes, benzene, ether, other solvents having high volatility and combinations thereof.

The liquid crystals to be purified can be any type of liquid crystals usable in display devices, for example, nematic liquid crystals (NLCs), cholesteric liquid crystals (CLCs), blue-phase liquid crystals, smectic liquid crystals (SLCs), antiferroelectric liquid crystals (AFLCs) and ferroelectric liquid crystals (FLCs). These liquid crystals can be purified alone or as a mixture thereof.

In some embodiments, the ions in the crude liquid crystal sample are organic ions. For example, the ions may be organic anions or organic cations, such as ions selected from the group consisting of phenolate ions, carboxylate ions and alkylated ammonium ions. In some embodiments, the ions are hydrated metal ions. In some embodiments, the ions have an ionic weight greater than or equal to 100 Daltons.

In an aspect, a method for separating ions from a liquid crystal sample, comprises contacting a crude liquid crystal sample containing ions and polyamide particles having an average particle size between 0.1 μm and 1000 μm, wherein each nitrogen within the polyamide is bound to at least one hydrogen, and separating the polyamide particles from the crude liquid crystal sample to produce a purified liquid crystal sample comprising fewer ions than the crude liquid crystal sample. The step of separating may, for example, include filtering, decanting, eluting and combinations thereof.

With respect to temperature, the step of contacting may be carried out at a temperature selected from a range of 20° C. to 140° C. or 20° C. to 120° C. and/or the step of separating may be carried out at a temperature selected from a range of 20° C. to 140° C. or 20° C. to 120° C. Generally, the parameters important to the temperature selection process are the viscosity of the liquid crystal, the chemical stability of the liquid crystal to high temperature, and the propensity of the ion guest to associate with the polyamide host. For these parameters, the desire for lower viscosity leads to a choice of higher temperatures, and the desire for more chemical stability and higher ion retention by the polyamide leads to a choice of lower temperatures.

Although the method for purifying liquid crystal material may be carried out by mixing the crude liquid crystal material and polyamide particles followed by filtering, the method may also be carried out by a column method. In either method, a step of contacting the crude liquid crystal sample and polyamide particles may be carried out for a time selected from a range of 1 second to several months, or from 10 seconds to one month, or from 30 seconds to 2 weeks, or from 60 seconds to 1 week, or from 120 seconds to 3 days, or from 5 minutes to 1 day, or from 5 minutes to 12 hours, or from 10 minutes to 2 hours. In another embodiment, the crude liquid crystal sample and polyamide particles may be in contact until the purified liquid crystal sample is loaded into a liquid crystal cell.

In the column method, the step of contacting may for example comprise applying the crude liquid crystal sample to a column packed with the polyamide particles, and the step of separating may comprise eluting a purified liquid crystal sample from the column. In some embodiments, the crude liquid crystal sample is applied to the column neat. In an embodiment, a mobile phase may be added to elute the purified liquid crystal sample from the column. For example, the mobile phase may be selected from the group consisting of toluene, hexanes, benzene, ether, ethyl acetate, acetone, 2-butanone, dichloromethane, nitromethane, tetrahydrofuran, acetonitrile and combinations thereof. In an embodiment, the column method may be a flash chromatography method involving application of gas pressure to the column to expedite elution of the purified liquid crystal sample. For example, the gas may be an inert gas or compressed air.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

A "device" is a combination of components operably connected to produce one or more desired functions.

A "component" is used broadly to refer to an individual part of a device, such as a liquid crystal cell of a liquid crystal display device.

"Polyamide" refers to a macromolecule with repeating units linked by amide bonds.

"Aramid" refers to an aromatic polyamide, or a polyamide containing aromatic molecules in a polymer chain.

"Nematic" refers to the phase of a LC characterized by arrangement of the long axes of the molecules in parallel fines but not layers. Thus, a nematic LC displays orientational molecular order, but not positional molecular order.

"Smectic" refers to the phase of a LC characterized by arrangement of molecules in layers with the long molecular axes in a given layer being parallel to one another and those of other layers and perpendicular or slightly inclined to the plane of the layer.

"Cholesteric" refers to a nematic phase of a LC characterized by arrangement of molecules with the long molecular axes parallel to one another in one plane and incrementally displaced in successive planes to give helical stacking.

"Antiferroelectric" refers to a smectic phase of a liquid crystal with tilted layers in which the dipoles of a given layer are oriented in the same direction, but dipoles of adjacent layers are oriented in the opposite direction, giving materials where the total macroscopic spontaneous electric polarization is zero.

"Ferroelectric" refers to a smectic phase of a liquid crystal with tilted layers in which the dipoles of a given layer are oriented in the same direction, and dipoles of adjacent layers are oriented in approximately the same direction, giving materials where the total macroscopic spontaneous electric polarization is non-zero.

The terms "direct" and "indirect" describe the actions or physical positions of one component or layer relative to another component or layer, or one device relative to another device. For example, a component or layer that "directly" acts upon or touches another component or layer does so without intervention from an intermediary. Contrarily, a component or layer that "indirectly" acts upon or touches another component or layer does so through an intermediary (e.g., a third component).

Materials and associated methods will now be described with reference to the following non-limiting examples.

EXAMPLE 1

Purification of a Ferroelectric Liquid Crystal Sample

This Example tests the effectiveness of a polyamide resin (PA) for removing ions in an FLC mixture.

Purification Procedure.

The LC mixture shown in Table 1 (DTC100) (35 mg) was mixed with PA (15 mg of nylon-6 resin (Sorbent Technologies, Inc. Norcross, Ga., 30 wt. %) at 120° C. for 2 min.

TABLE 1

Mixture (LTC100) of Liquid Crystals.

| Weight Percent (wt. %) | Component |
|---|---|
| 6 | <br>(R)-4-[6-(4-Hexylphenyl)-3-pyridinyl]-benzoic acid, 1-methylheptyl ester |
| 5 | <br>(2S)-2-Butoxypropanoic acid, (1S)-1-methyl-2-[[2-(4'-pentyl[1,1'-biphenyl]-4-yl)-5-pyrimidinyl]oxy]ethyl ester |
| 20 | <br>2-[3-Fluoro-4-(octyloxy)phenyl]-5-heptylpyridine |
| 20 | <br>2-[3-Fluoro-4-(octyloxy)phenyl]-5-octylpyridine |

TABLE 1-continued

Mixture (LTC100) of Liquid Crystals.

| Weight Percent (wt. %) | Component |
|---|---|
| 14 | <br>5-Pentyl-2-(4'-propyl-biphenyl-4-yl)-pyridine |
| 10 | <br>5-Octyl-2-(4'-pentyl[1,1'-biphenyl]-4-yl)pyrimidine |
| 5 | <br>2-[4-(Nonyloxy)phenyl]-5-octylpyrimidine |
| 10 | <br>5-Hexyl-2-(4'-pentyl[1,1'-biphenyl]-4-yl)pyrimidine |
| 10 | <br>2-(4'-Heptyl[1,1'-biphenyl]-4-yl)-5-octylpyrimidine |

Results.

Figure 1:
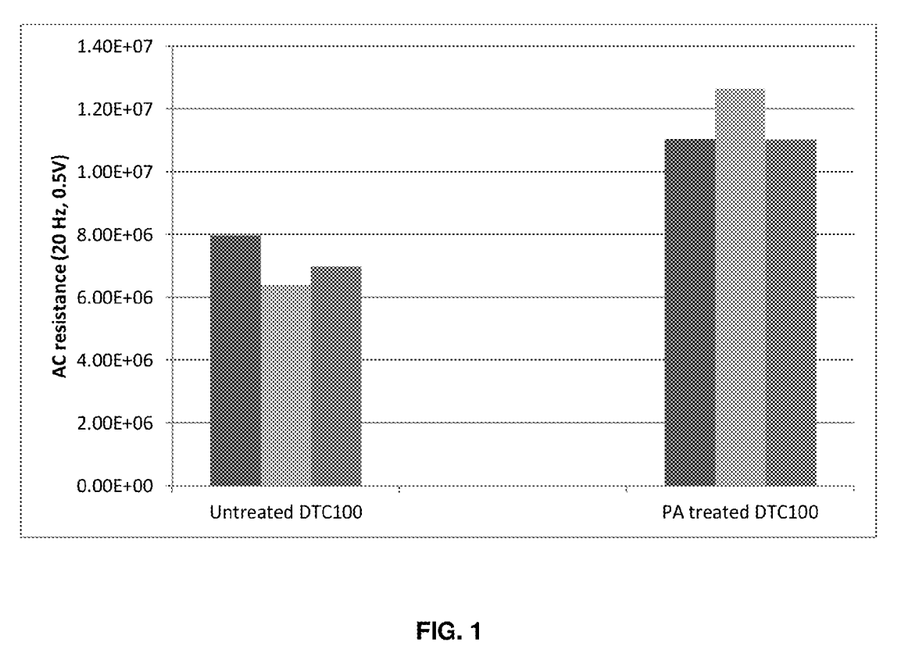
FIG. 1 shows AC resistance of 3 cells filled with treated/purified and untreated FLC material. The graph indicates an ~1.5× reduction in ion concentration after PA purification treatment according to methods disclosed herein.
Figure 2:
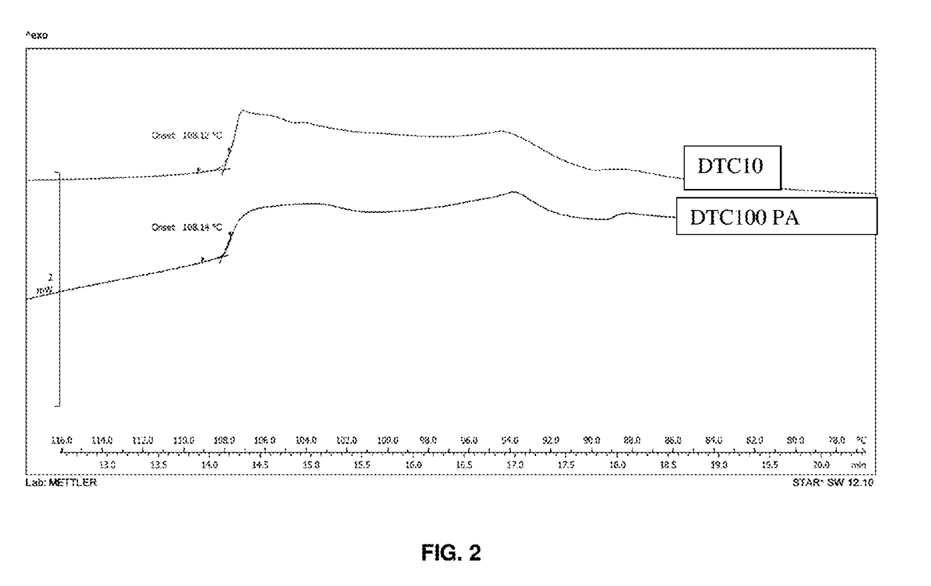
FIG. 2 shows Differential Scanning calorimetry (DSC) traces indicating unchanged I—N phase transition temperatures for an FLC sample before and after PA purification according to methods disclosed herein.

A comparison of the purified or treated LC sample and the untreated LC sample included impedance measurements. The LC mixture was used to fill ITO coated glass cells with a thickness of 4.5 μm and electrode area of 0.25 cm. The fill hole of the cell was small enough to filter out the polyamide particles. The impedance of the cell was measured on an HP 4284A LCR meter (20 Hz, 0.5V) at 100° C. FIG. 1 shows the AC resistance of 3 cells filled with treated and untreated LTC100. The graph indicates an ~1.5× reduction in on concentration after the PA treatment. The DSC trace of FIG. 2 shows no change in the I—N transition temperature before and after PA treatment. Thus, the purification treatment was selective for ions.

EXAMPLE 2

Purification of a Nematic Liquid Crystal Sample

A commercially available nematic liquid crystal sample (MDA-98-1602) was purchased from Merck (Kenilworth, N.J.) and purified according to the method of Example 1.

Results.

Figure 3:
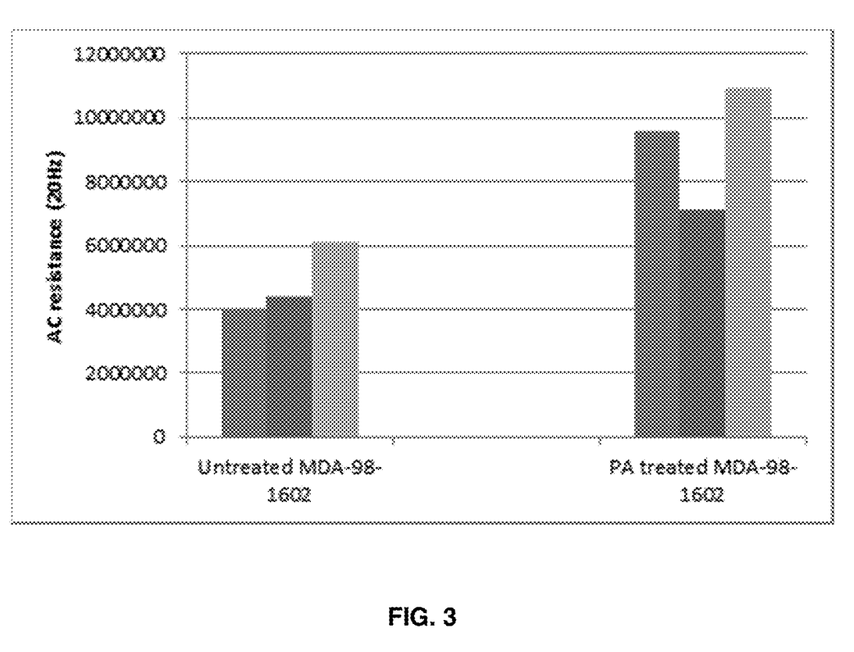
FIG. 3 shows AC resistance of 3 cells filled with treated/purified and untreated (as purchased) NLC material. The graph indicates an ~2× reduction in ion concentration after PA purification treatment according to methods disclosed herein.
Figure 4:
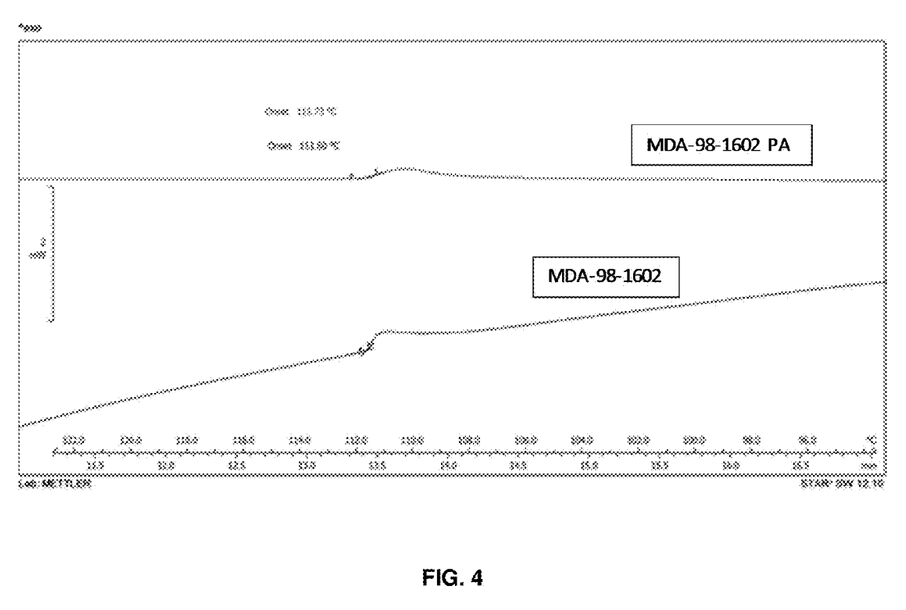
FIG. 4 shows Differential Scanning calorimetry (DSC) traces indicating unchanged I-N phase transition temperatures for a NLC sample before and after PA purification according to methods disclosed herein.

A comparison of the purified or treated NLC sample and the untreated or as-purchased NLC sample included AC resistance and differential scanning calorimetry measurements. FIG. 3 shows the AC resistance of 3 cells filled with treated and untreated MD-98-1602. The graph indicates an ~2× reduction in on concentration after the PA treatment. The DSC trace of FIG. 4 shows no change in the I—N transition temperature before and after PA treatment. Thus, the purification treatment was selective for ions.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in theft entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, and method steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomer and enantiomer of the compound described individually or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), one or more and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A method for separating ions from a liquid crystal sample, comprising:
    contacting (i) a crude liquid crystal sample containing ions and (ii) polyamide particles having an average particle size between 0.1 μm and 1000 μm, wherein each nitrogen within the polyamide is bound to at least one hydrogen; and
    separating the polyamide particles from the crude liquid crystal sample to produce a purified liquid crystal sample, the purified liquid crystal sample comprising fewer ions than the crude liquid crystal sample and having a substantially increased resistance relative to the crude liquid crystal sample.

2. The method of claim 1, wherein the step of separating comprises filtering, decanting, eluting and combinations thereof.

3. The method of claim 1, wherein the polyamide does not comprise bridging pairs of carbonyl groups.

4. The method of claim 1, wherein the polyamide has the formula (FX1):

(FX1)

where $R_1$ is selected from the group consisting of a chemical bond, a $C_{1-10}$ aliphatic group, an aromatic group and an —$R_2CONHR_3$— group, where $R_2$ and $R_3$ are each independently selected from a $C_{1-10}$ aliphatic group and an aromatic group; and where n is an integer greater than or equal to 10.

5. The method of claim 1, wherein the polyamide has the formula (FX2):

(FX2)

where $R_2$ and $R_3$ are each independently selected from a $C_{1-10}$ aliphatic group and an aromatic group; and where n is an integer greater than or equal to 10.

6. The method of claim 1, wherein the polyamide has a density selected from a range of 1.12 g/mL to 1.20 g/mL.

7. The method of claim 1, wherein the polyamide is selected from the group consisting of nylons and aramids.

8. The method of claim 1, wherein the polyamide is selected from the group consisting of nylon-6, nylon-6,6, nylon-6,9, nylon-6,10, nylon-6,12, nylon-11, nylon-12 and nylon-4,6.

9. The method of claim 1, wherein the polyamide is selected from the group consisting of poly-paraphenylene terephthalamide and poly-metaphenylene isophthalamide.

10. The method of claim 1, wherein the polyamide is present at a concentration of 1 wt. % to 50 wt. % based on the weight of the crude liquid crystal sample.

11. The method of claim 1, wherein the crude liquid crystal sample is neat.

12. The method of claim 1, wherein the crude liquid crystal sample is combined with a solvent.

13. The method of claim 12, wherein the solvent is selected from the group consisting of toluene, hexanes, benzene, ether and combinations thereof.

14. The method of claim 1, wherein the ions are organic ions.

15. The method of claim 14, wherein the ions are selected from the group consisting of phenolate ions, carboxylate ions and alkylated ammonium ions.

16. The method of claim 14, wherein the ions have an ionic weight greater than or equal to 100 Daltons.

17. The method of claim 14, wherein the ions are organic anions.

18. The method of claim 14, wherein the ions are organic cations.

19. The method of claim 1, wherein the ions are hydrated metal ions.

20. The method of claim 1, wherein the step of contacting is carried out at a temperature selected from a range of 20° C. to 140° C.

21. The method of claim 1, wherein the step of separating is carried out at a temperature selected from a range of 20° C. to 140° C.

* * * * *